United States Patent [19]

Karjalainen

[11] 4,437,344
[45] Mar. 20, 1984

[54] COMPOUND LIQUID FLOW METER WITH FAST CROSSOVER CHARACTERISTIC

[75] Inventor: William G. Karjalainen, Tallassee, Ala.

[73] Assignee: Neptune Water Meter Company, Tallassee, Ala.

[21] Appl. No.: 342,132

[22] Filed: Jan. 25, 1982

[51] Int. Cl.³ .............................................. G01F 7/00
[52] U.S. Cl. ...................................................... 73/197
[58] Field of Search ........................................... 73/197

[56] References Cited

U.S. PATENT DOCUMENTS

| | | | |
|---|---|---|---|
| 860,100 | 7/1907 | Meinecke | 73/197 |
| 2,148,253 | 2/1939 | Barge | 73/197 |
| 3,088,481 | 5/1963 | Brueckner et al. | 73/197 |
| 3,395,578 | 8/1968 | Simonds, Jr. | 73/197 |
| 3,453,884 | 7/1969 | Marx | 73/197 |

FOREIGN PATENT DOCUMENTS 1041704 10/1958 Fed. Rep. of Germany ........ 73/197

*Primary Examiner*—Herbert Goldstein

[57] ABSTRACT

This compound flow meter includes a high capacity meter and a low capacity meter connected in parallel with it. The flow through the high capacity meter is controlled by a main valve subject to the pressure difference across the meter and biased closed by a spring. The flow through the low capacity meter is controlled by an auxiliary valve. Mounted on the main valve is a means responsive to the pressure difference across it and moving in the same direction as the main valve in response to that pressure difference. That pressure difference responsive means operates a piston which is aligned with the auxiliary valve, so that the operation of the auxiliary valve is determined by the sum of the movements of the main valve and the pressure difference responsive means.

5 Claims, 5 Drawing Figures

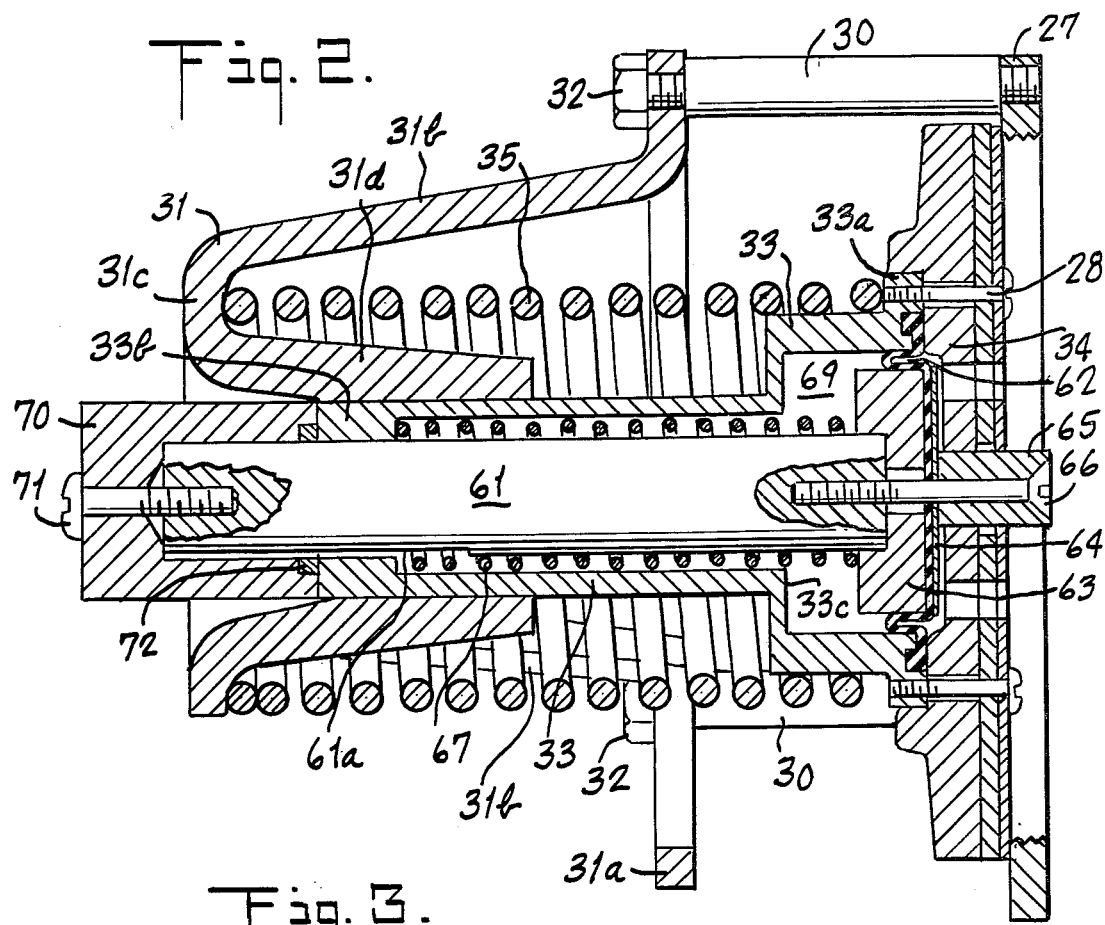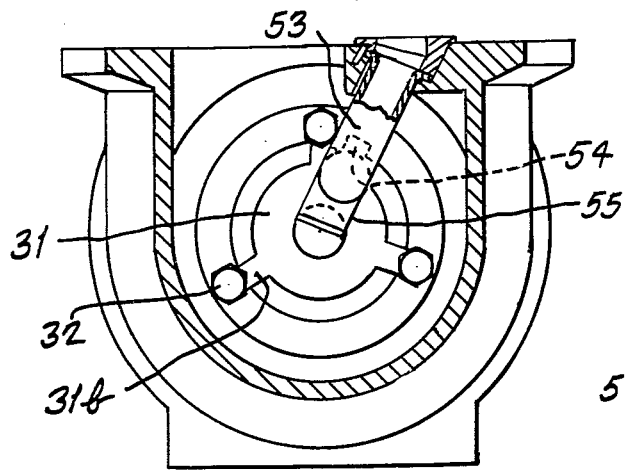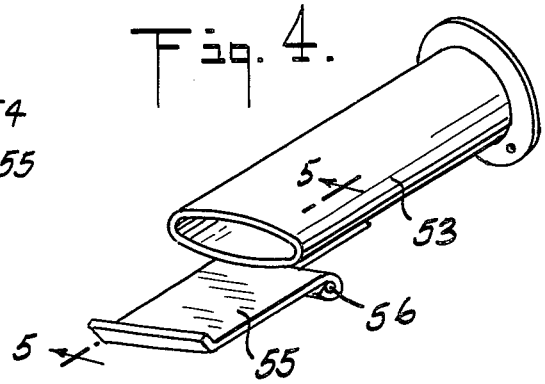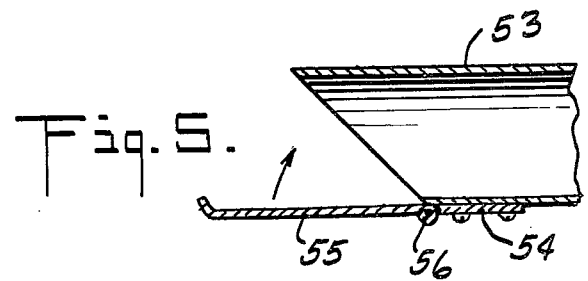

COMPOUND LIQUID FLOW METER WITH FAST CROSSOVER CHARACTERISTIC

CROSS-REFERENCE

The present invention is an improvement on the invention described and claimed in the copending application of Donald J. Kullmann et al., Ser. No. 80/00763-PCT, filed June 13, 1980, which is incorporated herein by reference.

BRIEF SUMMARY OF THE INVENTION

Compound liquid flow meters have parallel flow paths, one of which includes a turbine meter accurate over a wide range of relatively high flow rates, but inaccurate below a known minimum rate. The other flow path includes a meter accurate at low flow rates, but having a narrow range with a low maximum rate of flow greater than the minimum flow rate of the turbine meter. It is essential that the flow path through the turbine meter be closed by a valve during the low range of flow rates where that meter is inaccurate. It is desirable to have the valve quick-acting in response to the rate of flow, so that it opens quickly when the flow rate exceeds the minimum accurate flow rate of the turbine meter, and so that it closes quickly when the flow rate falls below that minimum.

Many quick-acting valve mechanisms have been proposed in the prior art. See for example Masson et al., U.S. Pat. No. 3,677,084 and Pelt, U.S. Pat. No. 4,100,800. The prior art quick-acting valve mechanisms are complex. Masson et al. uses a combined cam and toggle mechanism. Pelt uses a complex mechanism involving two cams and an inclined plane. The prior art compound meters including quick-acting valve mechanisms have reduced accuracy during the crossover range of flows during which the valve is opening or closing. This lack of accuracy is recognized in the standard for such meters published by The American Water Works Association and identified as their Standard C-702-78. That standard allows compound meters to have a minimum accuracy as low as 90% in the crossover range where the valve is opening or closing, but requires that the total crossover range of flow rates where accuracy is below 97% be limited (e.g., 30 gals. per min. for a 3 in. meter).

German Pat. No. 77,398 to Thien, dated April 22, 1894, shows a compound meter having its main valve biased closed by gravity. The main valve has an upwardly projecting sleeve which lies over ports in a tube constituting the downstream end of the auxiliary flow path, so that as the main valve opens, the auxiliary valve closes. The two valves are rigidly connected so that they necessarily move together.

The compound liquid flow meter of the present invention has a principal flow path including a wide range turbine meter which is accurate for a range of flows greater than a predetermined minimum flow. The meter also includes a parallel auxiliary flow path through a conventional meter such as a positive displacement meter, which is accurate over a lower range of flow rates. The upper end of that lower range overlaps the low end of the accurate range of flow rates of the turbine meter.

The compound meter includes a casing open along a portion of one side and having an inlet at one end and an outlet at the opposite end. The casing has a transverse wall between the inlet and the outlet, and an aperture in the wall is part of the principal flow path.

A main valve, which is disclosed as a simple poppet valve controls the flow through the aperture. That valve is mounted on a cylinder extending through a guide which also serves as a retainer for a spring which biases the valve to closed position. The pressure difference between the upstream and downstream sides of the compound meter acts on the valve in a valve-opening direction. The valve assembly including the valve, stem, guide and spring, is mounted on the downstream side of the transverse wall in the casing.

A cover for the open side of the casing supports the turbine meter within the casing on the upstream side of the transverse wall. The turbine meter must be one having a highly accurate characteristic, i.e., one which attains a high and constant accuracy at a rate of flow just slightly above the minimum rate which starts rotation of the turbine. The lower range meter is supported by the cover, which contains the parallel flow path.

This compound meter provides improved accuracy during the crossover between the closed main valve position, where only the lower range meter is functioning, and the open main valve position, wherein both meters are functioning. The main valve structure opens smoothly and quickly to turn the turbine meter on when the flow is great enough and closes smoothly and quickly to turn the turbine meter off when the flow is below the minimum accurate flow for that meter.

The main valve supports a pressure responsive means consisting of a diaphragm and a piston operated thereby. The piston moves within the cylinder that supports the main valve. The piston has an extension which projects downstream from the main valve. The auxiliary flow path terminates in a tube extending from the low flow meter transversely of the casing. At its end, the tube carries a valve which is aligned with and operated by the extension on the piston of the pressure responsive means.

When there is no flow through the compound meter, the main valve is closed and the auxiliary valve is open. As the flow increases, the positive displacement meter measures the flow, with the main valve remaining closed until the pressure difference across the meter becomes sufficient to compress the spring biasing the diaphragm of the pressure responsive means. That means then moves downstream, and the extension on its piston engages the valve in the auxiliary flow path, partially closing it. This increases the pressure difference across the compound meter to a value which starts the main valve opening. As soon as the main valve starts to open, it carries the pressure differential responsive means with it, thereby closing the auxiliary valve further and thus further increasing the pressure difference across the compound meter. The action is cumulative. The closing action of the auxiliary valve is determined by the sum of the movement of the pressure difference responsive means and the movement of the main valve. The closing movement of the auxiliary valve continues steadily and smoothly until it reaches a predetermined point, preferably not completely closed, and the turbine meter is measuring almost all the flow.

BRIEF DESCRIPTION OF THE DRAWINGS

FIG. 2 is an enlarged fragmentary view, partially in section, showing the main valve and the pressure differential responsive means.

FIG. 3 is a cross-sectional view taken on the line 3—3 of FIG. 1, with certain parts broken away.

FIG. 4 is a disassembled perspective view of the valve in the auxiliary flow path and its supporting tube.

FIG. 5 is a view taken on the line 5—5 of FIG. 4, but with the parts assembled.

DETAILED DESCRIPTION

Figure 1:
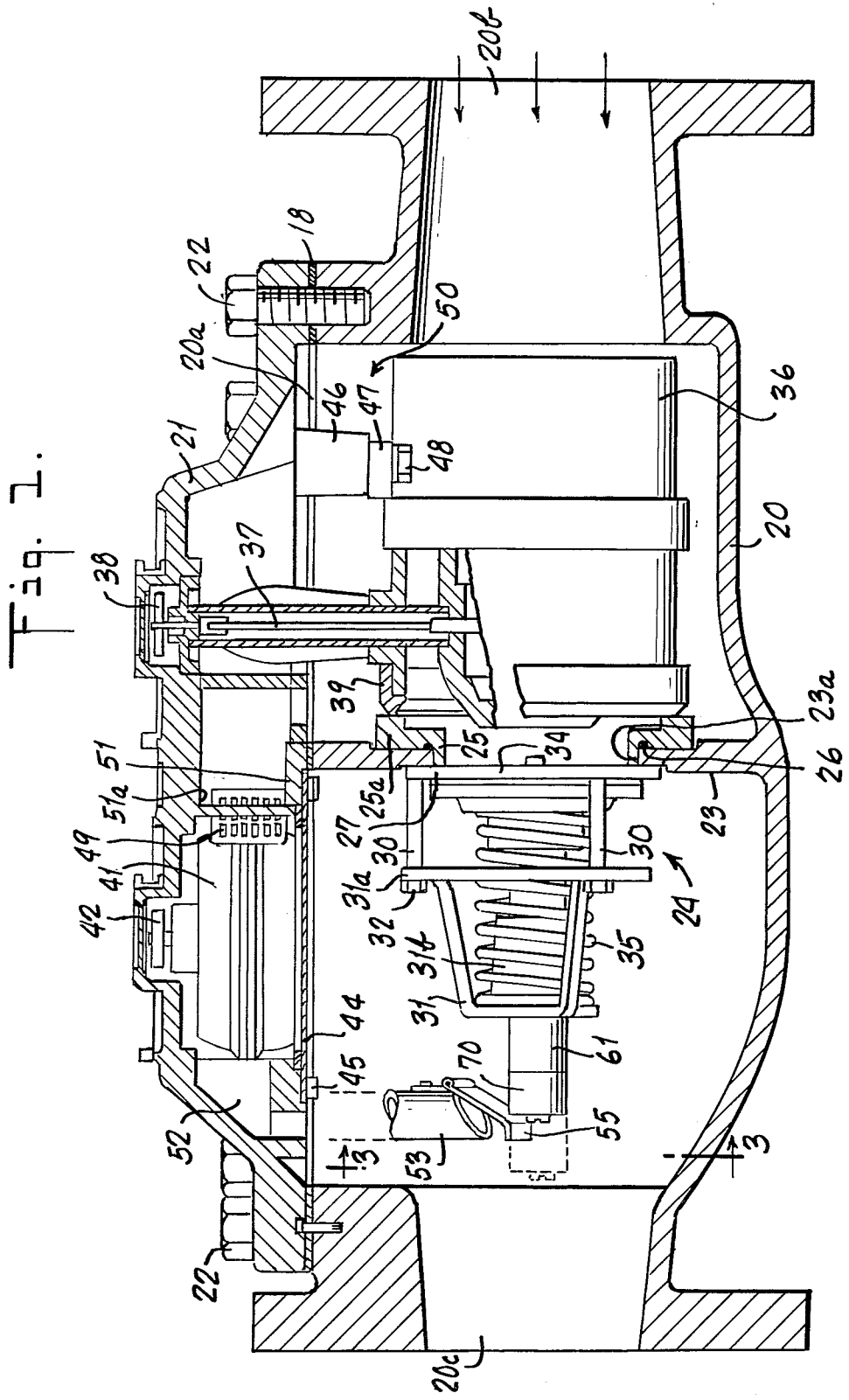
FIG. 1 is a central cross-sectional view of a compound meter embodying the invention.

The drawings illustrate in detail a preferred em-bodiment of the present invention. This compound meter includes a casing 20 open at the top, as shown at 20a, and closed by a cover 21 held in place by bolts 22. A gasket 18 seals the connection between casing 20 and cover 21. The casing 20 has an inlet 20b at the right-hand end, as it appears in the drawing, and an outlet 20c at the left-hand end. A transverse wall 23 extends across the casing 20 midway between the inlet 20b and the outlet 20c and is provided with a central aperture 23a.

Mounted on the transverse wall 23 is a valve assembly 24 including a valve seat 25 extending through the aperture 23a and having a flange 25a engaging the upstream face of the wall 23. A seal ring 26 is provided between the flange 25a and the wall 23. The seat 25 projects through the wall 23. A ring 27 (FIGS. 1 and 2) is threaded onto the projecting downstream end of the seat 25. The ring 27 carries a plurality of peripherally spaced studs 30 projecting downstream from the wall 23. A retainer 31 has a flange 31a apertured to engage shoulders on the studs 30. The flange 31a is held in place on the studs 30 by means of nuts 32. The retainer 31 includes a plurality of legs 31b connecting the flange 31a to a retainer ring 31c attached to a central cone 31d which serves as a guide for a cylinder 33 connected by screws 28 to a main valve 34 which cooperates with the seat 25. A coil spring 35 is held in compression between the valve 34 and the ring 31c of retainer 31.

The cover 21 supports within the casing 20 a turbine meter 36 located on the upstream side of the wall 23. The meter 36 drives an upwardly extending shaft 37 carrying at its upper end a rotating permanent bar magnet 38 which drives an indicator of conventional construction. The downstream end of meter 36 is sealed to the flange 25a by a molded seal ring 39.

The cover 21 also carries a low flow meter 41 which may be a conventional positive displacement meter of the nutating disc type. The meter 41 drives another permanent magnet 42 which drives another indicator. The low flow meter 41 is located entirely within the cover 21, being retained in a chamber whose lower end is closed by a plate 44 held in place by screws 45.

A stud 46 projects downwardly from the cover 21. A bar 47 is fixed on the top of the turbine meter 36 and is attached to the stud 46 by means of bolts 48.

The main flow path of the compound meter extends from the inlet 20b through the turbine meter 36 and thence through the valve 34 to the outlet 20c.

The parallel auxiliary flow path from the inlet 20b through the positive displacement meter 41 may be traced through a narrow space (arrow 50 in the drawing) at the upstream end of the turbine meter 36. A transverse wall 51 extends across the cover 21 and is aligned with the transverse wall 23 in casing 20. The auxiliary flow path extends through a strainer 49 located in an opening 51a in the wall 51 into a chamber containing the positive dis-placement meter 41.

From the chamber containing the positive displacement meter 41, the auxiliary flow path extends through an opening 52 and into a tube 53 (FIG. 3) extending downwardly into the main flow path. Attached to the lower end of the tube 53 is a plate 54 on which a valve 55 is mounted by means of a hinge 56. The valve is self-biased by gravity toward its open position. A spring hinge may be used for the same pur-pose, for those installations (e.g., vertical mounting) where gravity would not be sufficient. Even with no bias, and with gravity acting to close the valve, it will be opened by the flow immediately upon initiation of that flow.

The cylinder 33, best seen in FIG. 2, has a flange 33a at its right-hand end which is attached to the valve 34 by screws 28. The spring 35 is held in compression between the retainer ring 31c and the flange 33a. The other end of the cylinder 33 has an inwardly projecting flange 33b, in which is slidably mounted a piston 61. A diaphragm 62 has its periphery clamped between the flange 33a and the valve 34. The central part of the diaphragm 62 is clamped between a spring retainer disc 63 and another disc 64 held in place by a sleeve 65 which receives a screw 66 threaded into the end of the piston 61. A spring 67 is retained in compression between the flange 33b of the cylinder 33 and the retainer disc 63 and biases the diaphragm 62 and its associated parts toward the valve 34.

The left-hand end of the piston 61 is cut away as shown at 61a to provide a flow path between the outlet end of the compound meter and the chamber 69 defined by the cylinder 33, piston 61 and diaphragm 62.

The end of the stem 61 has a cap 70 held in place by a screw 71. An O-ring 72 is located between the cap 70 and the flange 33b. The purpose of the cap 70 is to engage the end 33b of cylinder 33 and thereby limit the movement of the diaphragm 62 toward the valve 34, so that it does not engage the valve 34 at any time. The movement of diaphragm 62 to the left in FIG. 2 is limited by engagement of the retainer disc 63 and a shoulder 33c on the inside surface of cylinder 33.

OPERATION

When there is no flow through the compound meter, the main valve 34 is biased closed by the spring 35, and the auxiliary valve 55 is biased open either by gravity or by a spring hinge, as mentioned above. If the flow starts at a low rate, all flow is then through the auxiliary flow path and the positive displacement meter 41. This flow will produce a difference in pressure between the inlet 20b and the outlet 20c.

As the flow increases, the pressure difference increases and eventually reaches a value such that the diaphragm 62, which is exposed to that pressure difference, moves to the left. As that motion continues, the cap 70 engages the valve 55 and moves it toward closed position, thereby increasing the pressure difference between the inlet 20b and the outlet 20c, even without a further increase in the flow rate. When that pressure difference exceeds the value determined by the strength of the spring 35, that spring compresses, allowing the valve 34 to open. The valve 34 carries a pressure difference responsive means including the diaphragm 62 with it, so that the valve 55 is moved through a distance equal to the sum of the motion of the valve 34 and of the diaphragm 62. The action becomes cumulative. Each increment of closing movement of valve 55 results in a further increase in the pressure difference between the inlet and the outlet. Each increment of pressure difference opens the valve 34 more widely, thereby closing the valve 55 more. The motion of valve 55 therefore continues until it reaches its minimum flow position. It is desirable that the valve 55 should not be fully closed, so that the meter 41 will continue to operate at a low rate, even though the valve 34 is fully opened. The purpose of this operation of the meter 41 is to keep it from sticking at a time when the valve 34 remains fully open for an extended period.

In assembling the compound meter, the valve assembly 24 is mounted on the transverse wall 23 of casing 20. The meters 36 and 41 are mounted on the cover 21. The assembly consisting of the cover and the two meters may then be put in place on the casing 20. The meter 36 passes through the opening 20a in the top of the casing 20 with adequate clearance on all aides. The cover assembly is then fastened in place with the bolts 22 and the compound meter is complete.

What is claimed is:

1. A compound liquid flow meter, comprising:
   a. a first flow path between an inlet and an outlet, including a first meter accurate over a first range of flow rates above a predetermined flow rate;
   b. a second flow path between the inlet and the outlet, including a second meter accurate over a second range of flow rates below and overlapping said first range;
   c. first valve means controlling the flow through said first meter and biased toward closed position, said valve means being subject to the pressure difference between the inlet and the outlet, said pressure difference being effective to open the valve means against its bias when the pressure difference exceeds a predetermined value corresponding to a flow rate in the overlapping portion of said ranges;
   d. second valve means controlling the flow through the second meter, said second valve means being movable between a minimum flow position and an open position and being moved toward said open position by the flow through said second meter;
   wherein the improvement comprises:
   e. means mounted on the first valve means and movable with respect thereto in response to the pressure difference between the inlet and the outlet, said last-named means being effective when the pressure difference exceeds a value slightly smaller than said predetermined value to initiate movement of the second valve means toward its minimum flow position, said initial movement of said second valve means being effective to increase the pressure difference to said predetermined value even though the flow rate remains constant, so that opening movement of the first valve means is initiated and movement of both the first and second valve means continues until the first valve means reaches its open position and the second valve means reaches its minimum flow position.

2. A compound liquid flow meter as in claim 1, in which said pressure difference responsive means and said first valve means move in the same direction in response to a change in said pressure difference above said predetermined value, so that said second valve means is then moved through a distance determined by the sum of the movements of said pressure difference responsive means and of the first valve means.

3. A compound liquid flow meter as in claim 2, in which said pressure difference responsive means comprises:
   a. a cylinder having one end fixed on said first valve means and enclosing a chamber on the downstream side thereof;
   b. a diaphragm clamped between the cylinder and the first valve means;
   c. a piston attached to the diaphragm and extending through the cylinder outwardly toward a position of engagement with said second valve means; and
   d. a spring enclosed by the cylinder and biasing the diaphragm for movement toward the first valve means.

4. A compound liquid flow meter as in claim 2, in which:
   a. said second flow path includes a tube having one end extending transversely of the path of movement of said pressure difference responsive means; and
   b. said second valve means comprises a valve at the end of the tube engageable by the pressure differential responsive means and movable thereby toward closed position.

5. A compound liquid flow meter as in claim 4, including:
   a. a plate fixed on the upstream side of said one end of the tube;
   b. a hinge attached to the plate, said valve being connected to said hinge so as to project into the path of the pressure differential responsive means.

* * * * *